United States Patent
Green et al.

(10) Patent No.: US 10,384,703 B2
(45) Date of Patent: Aug. 20, 2019

(54) INVENTORY PROCESSING CART AND METHOD OF USE THEREOF

(71) Applicant: Walmart Apollo, LLC, Bentonville, AR (US)

(72) Inventors: Jeffrey Green, Bentonville, AR (US); Jesse Ashley, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 189 days.

(21) Appl. No.: 15/667,176

(22) Filed: Aug. 2, 2017

(65) Prior Publication Data

US 2018/0050714 A1 Feb. 22, 2018

Related U.S. Application Data

(60) Provisional application No. 62/377,284, filed on Aug. 19, 2016.

(51) Int. Cl.
*G06Q 20/20* (2012.01)
*B62B 3/14* (2006.01)
*G06Q 10/08* (2012.01)

(52) U.S. Cl.
CPC .......... *B62B 3/1428* (2013.01); *B62B 3/1472* (2013.01); *G06Q 10/087* (2013.01); *G06Q 20/203* (2013.01); *G06Q 20/208* (2013.01); *B62B 2203/50* (2013.01)

(58) Field of Classification Search
CPC .................................................. G06Q 20/203
See application file for complete search history.

(56) References Cited

U.S. PATENT DOCUMENTS

| D152,249 | S | 1/1949 | Fox |
| 3,749,191 | A * | 7/1973 | Ashen ............... G01G 19/40 177/1 |
| 5,333,885 | A | 8/1994 | Pullman |
| 5,427,394 | A | 6/1995 | Lauto |
| D371,663 | S | 7/1996 | Muller-Deisig et al. |
| D461,941 | S | 8/2002 | Underbrink et al. |

(Continued)

OTHER PUBLICATIONS

Karst, Tom, "Wal-Mart's carts—will they engage consumers in the produce department?", The Packer.com, Farm Journal Inc., Jul. 12, 2016.

(Continued)

*Primary Examiner* — A. Hunter Wilder
(74) *Attorney, Agent, or Firm* — Schmeiser, Olsen & Watts LLP; Jason A. Murphy

(57) ABSTRACT

A inventory processing cart including a body portion, the body portion having a top surface and a plurality of walls that define an interior region between the plurality of walls and beneath the top surface, an opening in the top surface, the opening providing access to the interior region of the body portion, a weighing device, the weighing device positioned proximate the opening in the top surface of the body portion, a stowing system disposed within the interior region of the body portion, the stowing system configured to receive one or more containers within the interior region of the body portion, wherein the opening is configured to receive store product that has been accounted for by the weighing device, is provided. Furthermore, an associated method is also provided.

11 Claims, 5 Drawing Sheets

(56) References Cited

U.S. PATENT DOCUMENTS

| | | | |
|---|---|---|---|
| D510,168 S | 9/2005 | Lovegrove et al. | |
| 7,318,529 B2 | 1/2008 | Mallett et al. | |
| D640,437 S | 6/2011 | Opsahl et al. | |
| 8,167,322 B2 | 5/2012 | Greene | |
| D667,602 S | 9/2012 | Salmon | |
| D703,904 S | 4/2014 | Knoll et al. | |
| 8,950,671 B2 | 2/2015 | Chan et al. | |
| 8,967,632 B1 | 3/2015 | Gunsaullus | |
| 9,090,276 B1 | 7/2015 | Ihrke et al. | |
| 9,292,853 B2 | 3/2016 | Ascarrunz et al. | |
| D763,534 S | 8/2016 | Liao et al. | |
| 2005/0065640 A1* | 3/2005 | Mallett | B07C 7/005 700/224 |
| 2005/0146103 A1 | 7/2005 | Lampe | |
| 2013/0332322 A1 | 12/2013 | Perkins | |
| 2014/0086771 A1* | 3/2014 | Bassani | F04B 43/12 417/474 |

OTHER PUBLICATIONS

"Phlebotomy Trolley", Medstore.ie, Medstore Medical, accessed Aug. 8, 2016.

Examiner's Report in Canadian Design Patent Application No. 169962, dated Nov. 29, 2016; 1 page.

Non-Final Office Action in Design U.S. Appl. No. 29/574,939, dated May 12, 2017; 6 pages.

Notice of Allowance in Design U.S. Appl. No. 29/574,939, dated Aug. 25, 2017; 7 pages.

\* cited by examiner

INVENTORY PROCESSING CART AND METHOD OF USE THEREOF

RELATED APPLICATIONS

This application claims the benefit of U.S. Provisional Patent No. 62/377,284, filed Aug. 19, 2016, entitled "Inventory Processing Cart and Method of Use Thereof," the contents of which are incorporated by reference herein in their entirety.

FIELD OF TECHNOLOGY

The following relates to an inventory processing cart, and more specifically to a cart used for selectively disposing and accounting for inventory from a display area of a store.

BACKGROUND

Store product is generally openly displayed for customer browsing and selecting for purchase. Current practices involve removing unsatisfactory store product from the salesfloor to ensure that standards are met. For instance, routine procedures are in place to remove produce items that fall below a certain standard from the sale floor to ensure that the freshest produce remain available for purchase. These procedures typically involve a store representative gathering store product from the salesfloor and placing the store product on a cart for disposal, and then accounting for the store product at a later time, in a location unseen from the salesfloor. Accordingly, the store representative has to account for the disposed merchandise separately from the gathering step, and is not present on the salesfloor to assist customers during such accounting.

Thus, a need exists for an inventory processing cart that allows for an accounting of the store product when the store product is gathered for disposal, and method of use thereof.

SUMMARY

A first aspect relates generally to an inventory processing cart comprising a body portion, the body portion having a top surface and a plurality of walls that define an interior region between the plurality of walls and beneath the top surface, an opening in the top surface, the opening providing access to the interior region of the body portion, a weighing device, the weighing device positioned proximate the opening in the top surface of the body portion, and a stowing system disposed within the interior region of the body portion, the stowing system configured to receive one or more containers within the interior region of the body portion, wherein the opening is configured to receive store product that has been accounted for by the weighing device.

A second aspect relates generally to a cart for culling produce, comprising a body portion having a top surface and a plurality of walls defining an interior region, wherein a stowing system is located within the interior region, a plurality of zones of the interior region, wherein each zone of the plurality of zones is associated with a container stowed by the stowing system that is designated to receive a different class of culled produce, and a weighing device positioned on a shelf operably coupled to the body portion, the weighing device configured to obtain a weight of produce culled from a salesfloor, wherein a first zone of the plurality of zones is located beneath an opening in the top surface.

A third aspect relates generally to a method of processing inventory with a cart, the cart including a body portion having a top surface and a plurality of walls that define an interior region, and an opening in the top surface that provides access to the interior region of the body portion, the method comprising partitioning the interior region of the body portion of the cart into a plurality of zones, the plurality of zones including a first zone, a second zone, and a third zone designating the first zone to receive a first type of store product, the second zone to receive a second type of store product, and the third zone to receive a third type of stored product, and accounting for the first type of store product removed from a display area by weighing the store product with a weighing device positioned proximate the opening in the top surface of the body portion, wherein the first zone of the plurality of zones is located beneath an opening in the top surface such that a container stowed within the first zone receives the first type of store product through the opening after the first type of store product is weighed by the weighing device.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
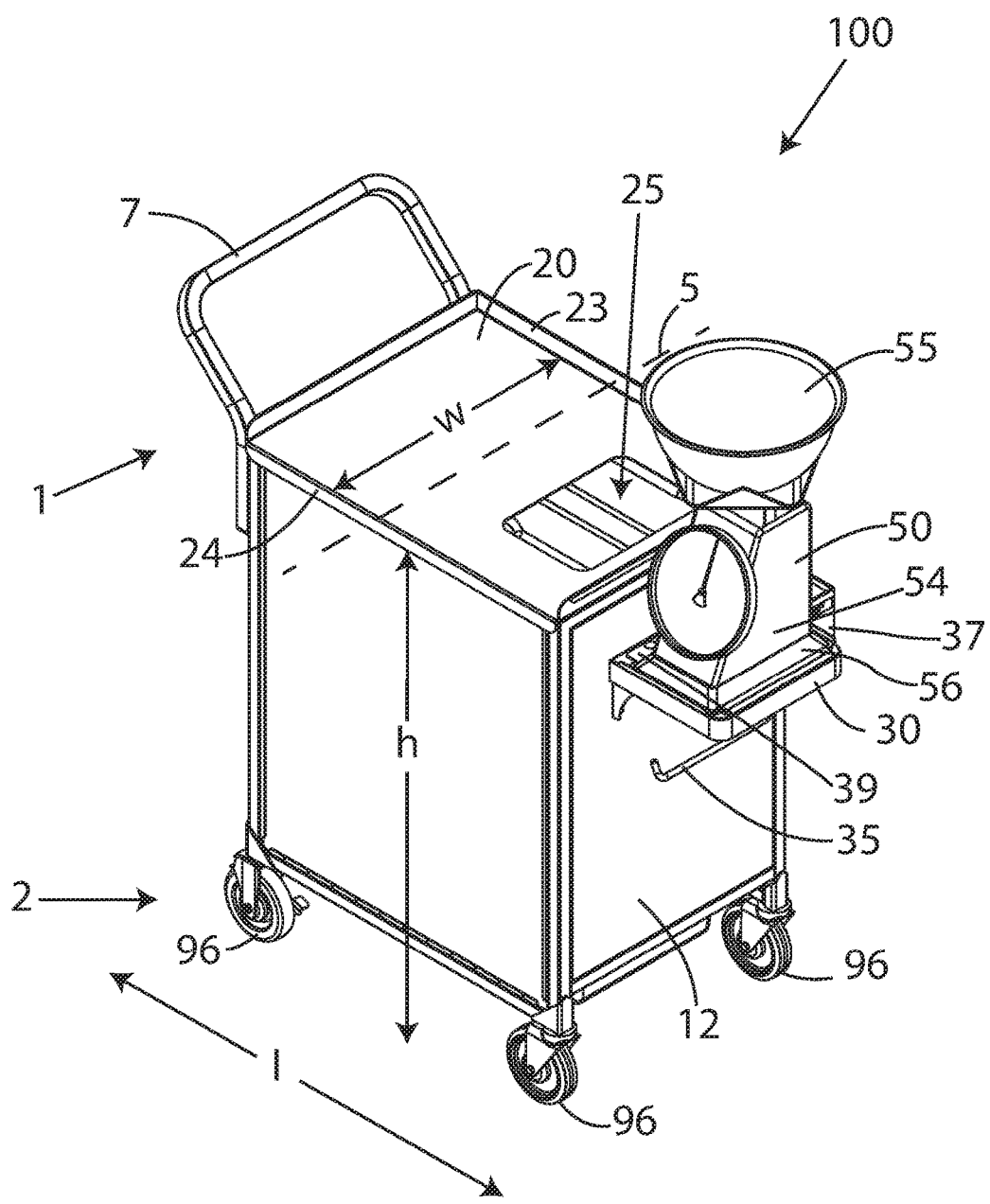
FIG. 1 depicts a perspective view of an embodiment of a cart for processing inventory, in accordance with the present invention.
Figure 2:
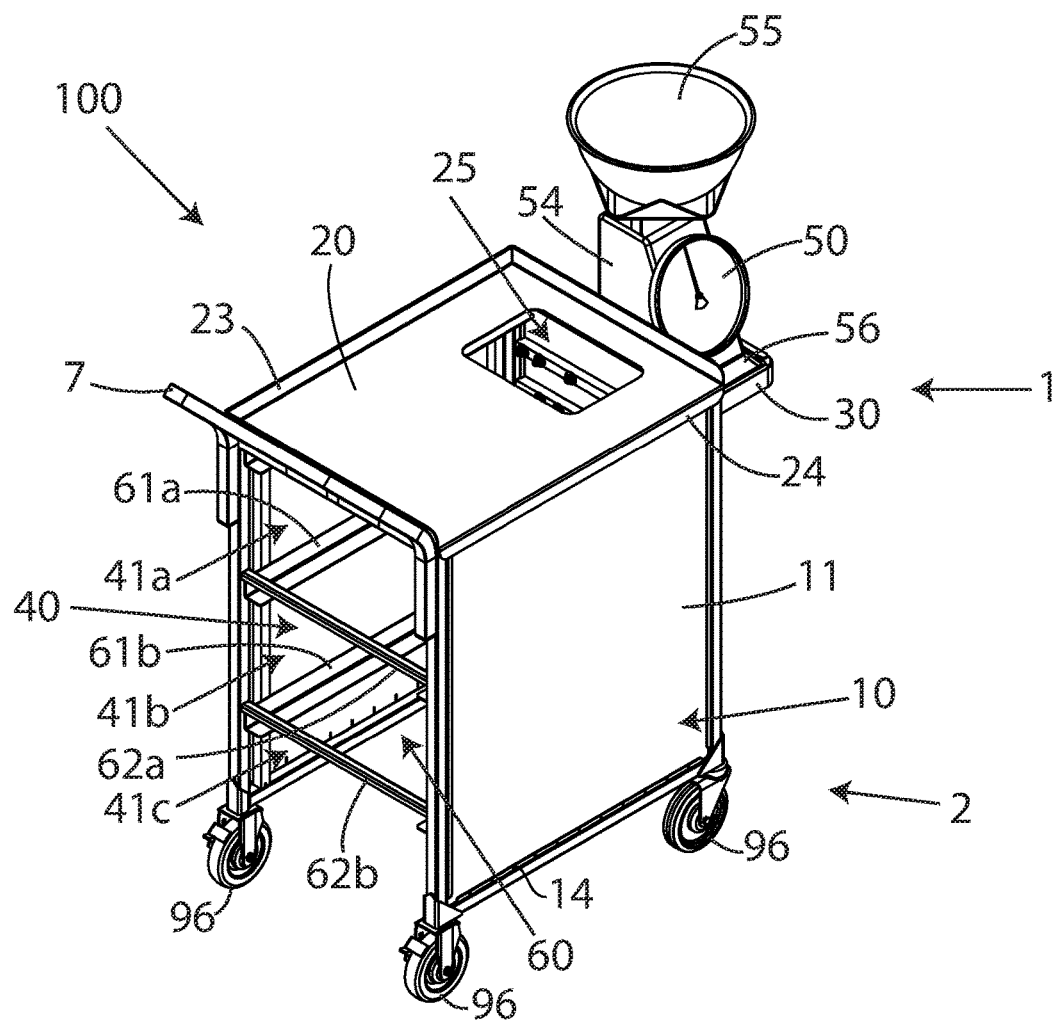
FIG. 2 depicts a perspective view of an embodiment of a cart for processing inventory showing an embodiment of a stowing system, in accordance with the present invention.

Referring to the drawings, FIGS. 1-2 depict an embodiment of an inventory processing cart 100. Embodiments of the inventory processing cart 100 may be a cart, a produce culling cart, a quality improvement cart, a portable cart, a portable device, a portable inventory processing device, a produce management cart, a wagon, a carriage, a pushcart, and the like. Embodiments of the inventory processing cart 100 may be used to process, manage, organize, store, collect, gather, classify, and/or account for inventory. Inventory may be store inventory, products, store products, merchandise, goods, items, food, produce, bagged produce, fruits, vegetables, meat, grocery items, condiments, houseware items, dairy, hardware, and the like. In an exemplary embodiment, the inventory processing cart 100 may be used when culling produce from a salesfloor. Culling may refer to a process of removing product, such as produce, from a salesfloor that does not meet acceptable standards for selling to a customer. From an inventory processing/managing standpoint, products that are culled from a salesfloor should be accounted for, usually by weight, to ensure an accurate inventory count for markdowns, waste, donations, etc.

In addition, the products being removed from the salesfloor may be classified or otherwise organized based on a plurality of factors. The plurality of factors may include a level of damage to the product, predetermined expiration dates, a condition, a ripeness, packaging, a location found on the salesfloor, an intended destination, and/or a combination thereof. Based on the plurality of factors, the removed products may be disposed within the inventory processing cart 100 at a particular location, described in greater detail infra.

Embodiments of the inventory processing cart 100 may include a body portion 10, an opening 25 providing access to an interior region 40 of the body portion 10, a stowing system 60, and a weighing device 50. In an exemplary embodiment, the inventory processing cart 100 may include a body portion 10, the body portion 10 having a top surface 20 and a plurality of walls 11, 12, 13 that define an interior region 40 between the plurality of walls 11, 12, 13 and beneath the top surface 20, an opening 25 in the top surface 20, the opening 25 providing access to the interior region 40 of the body portion 10, a weighing device 50, the weighing device 50 positioned proximate the opening 25 in the top surface 20 of the body portion 10, and a stowing system 60 disposed within the interior region 40 of the body portion 10, the stowing system 60 configured to receive one or more containers 65 within the interior region 40 of the body portion 10, wherein the opening 25 is configured to receive store product that has been accounted for by the weighing device 50.

Referring still to FIGS. 1-2, embodiments of the inventory processing cart 100 may include a body portion 10. Embodiments of the body portion 10 may be a frame, a cart frame, a body, base, a wheeled base, a wheeled frame, a structure, a cart structure, and the like. The body portion 10 may be a combination of frame components and walls to form a base or body structure of the inventory processing cart 100. Embodiments of the body portion 10 may include a top surface 20 and a plurality of walls 11, 12, 13. The walls 11, 12, 13 may be operably coupled to a frame system to define walls or faces of the body portion 10. In some embodiments, the walls 11, 12, 13 may be fastened or otherwise affixed to a general frame structure to form the body portion 10. In other embodiments, the walls 11, 12, 13 may be welded or otherwise formed structurally integral with a frame system to define the body portion 10 of the cart 100. Walls 11, 12 may be side walls forming a part of the body portion 10, and wall 13 may be a front wall of the body portion 10. Further, signage, branding and/or promotional material 14 may be removably attached to one or more of the walls 11, 12, 13. The signage 14 may be attached or otherwise coupled to the walls 11, 12, 13 using a variety of attachments means. For example, the signage 14 may be fastened to the wall using conventional fastening means, such as bolts, tape, screws, etc., placement of hook and loop fasteners, or may be adhered to the walls 11, 12, 13 using an adhesive. In other embodiments, edges of the signage 14 may be fit within grooves along a perimeter of the walls 11, 12, 13, wherein one or more edges of the signage 14 are covered by the elongated groove(s) of a metal strip fixed to the walls 11, 12, 13. The signage 14 may be replaced with new signage to accommodate new promotions.

Moreover, embodiments of the body portion 10 may include a top surface 20. The top surface 20 may be a shelf, a removable shelf, a top side, a top wall, a substrate, a planar surface, a level workpiece, and the like. The top surface 20 may be operably coupled to a frame and/or frame component of the body portion 10, and may be oriented perpendicular or substantially perpendicular to the walls 11, 12, 13. For example, the top surface 20 may rest upon an internal flange or lip that protrudes a distance from an inner surface of the walls 11, 12, 13. Alternatively, the top surface 20 may be removably secured by fasteners. One or more support members may be positioned underneath the top surface 20 for added support of the top surface 20. The one or more support members may be cross-members or other structural members that extend from one wall 11 to the opposing wall 12 within the internal region 40 of the body portion 10.

Moreover, a lip 23 may be provided along a perimeter of the top surface 20. The lip 23 may be a lip, edge, wall, and the like, that may protrude upwards from the top surface 20 to help prevent items from rolling or sliding off the top surface 20, as well as restrict undesirable movement of a product tote placed upon the top surface 20. In some embodiments, the lip 23 may not extend along one or more sides of the top surface 20. For example, a side proximate the side wall 11 may not have a lip 23, which may allow for convenient placement and removal of boxes, product totes, containers, and the like onto the cart 100. Further, a flange 24 may extend downwards from the top surface 20 and cover a portion of one or more wall of the plurality of walls 11, 12, 13. The flange 24 may be structurally integral with the top surface 20, and machined or otherwise manufactured to bend downwards. In other embodiments, the flange 24 may be separate component operably fixed at a joint between the top surface 20 and the walls 11, 12, 13. Embodiments of the flange 24 may be used to cover or otherwise hide mounting hardware used to fix the signage 14 to the walls 11, 12, 13, or the mounting hardware used to operably fix the walls 11, 12, 13 to a frame of the body portion 10.

Figure 3:
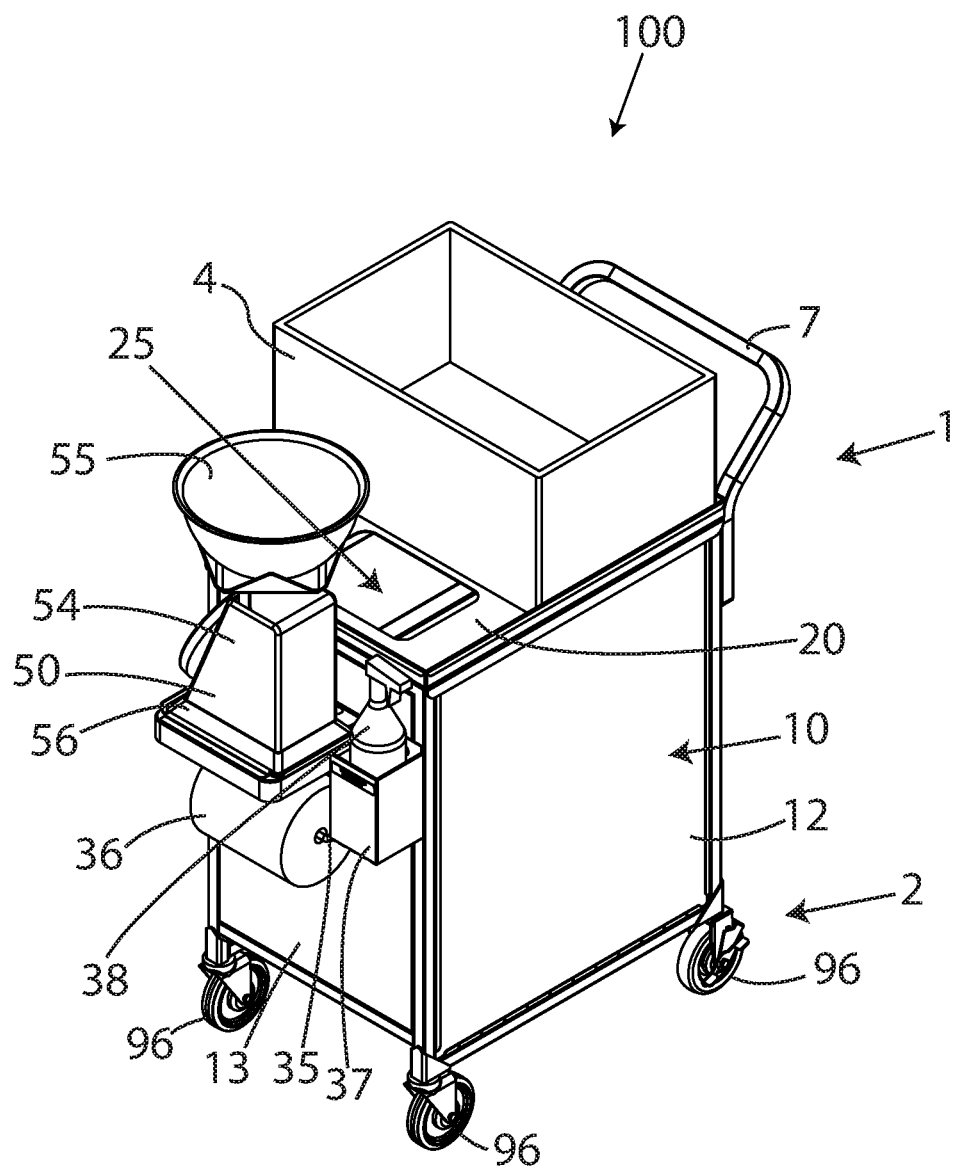
FIG. 3 depicts a perspective view of an embodiment of a cart, having an embodiment of a product display container positioned thereon, in accordance with the present invention.

With continued reference to FIGS. 1-2, and additional reference to FIG. 3, embodiments of the top surface 20 may be a workstation, a workspace, a level surface, and the like, wherein a product display container 4 may be placed on the top surface 20 for processing inventory using the cart 100. Embodiments of the product display container 4 may be a container, a box, a tote, a product tote, a reusable plastic crate (RPC), a collapsible crate, a display container, a display tote, an item holder, a case, chest, package, and the like. The product display container 4 may contain product items, and may be located on the salesfloor to display/store the items to the customers. In many embodiments, the product display container 4 can be the same container used for shipping, delivering, and transporting the items. In exemplary embodiment, the product display container 4 is a RPC tote for produce, wherein the produce is shipped within the RPC tote as well as displayed on the salesfloor in the RPC tote. Because the inventory processing, such as culling, occurs on the salesfloor, a width, w, of the top surface 20 of the cart 100 may correspond to a size (length or width) of an industry standard product display container 4, such as a RPC tote for produce. In other words, the top surface 20 dimensions may correspond to dimensions of a bottom surface of a standard sized RPC tote. In an exemplary embodiment, the product display container 4 may abut or reside contiguous to the lip 23 of the top surface 20 when placed in a working position on the top surface 20 of the cart 100. In another exemplary embodiment, the width, w, of the top surface 20 may range from 18 inches to 25 inches, such as 19.52 inches.

Furthermore, embodiments of the cart 100 may include an opening 25 in the top surface 20 to provide access to an interior region 40 of the cart 100. Embodiments of the opening 25 may be a cut-out, a window, a gap, a hole, an access, an access point, a disposal, and the like. Embodiments of the opening 25 may extend through a thickness of the top surface 20, or top shelf, so that product items may pass through the top surface 20 into the interior region 40 of the cart 100, described in greater detail infra. The opening 25 may be positioned on a side of the top surface 20. In other words, the opening 25 may be off-center and positioned to a side of the top surface 20 closest to the weighing device 50. Alternatively, the opening 25 may be positioned on an opposing side, furthest away from the weighing device 50. Transverse axis 5 defines a center line of the top surface 20, wherein the opening 25 may be disposed on either side of the transverse axis 5, proximate the lip 23 of the top surface 20. The opening 25 may be a rectangular-shaped opening, a square-shaped, a circular-shaped opening, or any other polygonal or curvilinear-shaped opening. Embodiments of the opening 25 may vary in size. In one embodiment, the opening may be 10.5 inches×7.25 inches, and positioned 2-3 inches from the lip 23 on the side of the top surface 20 proximate the weighing device 50. Another embodiment includes an opening 25 measuring between 8-12 inches×5-8 inches.

Figure 4:
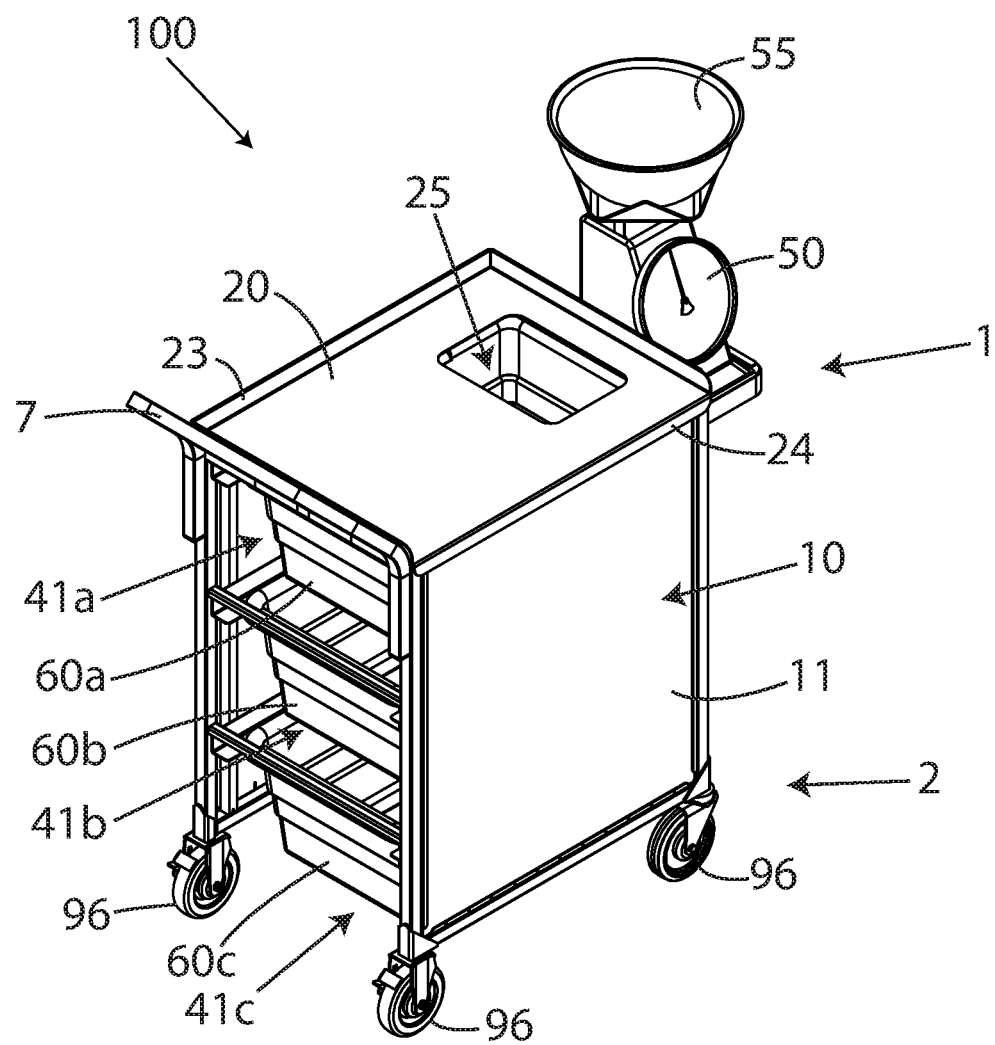
FIG. 4 depicts a perspective view of an embodiment of a cart having one or more containers stowed within an interior region of the cart, in accordance with the present invention.
Figure 5:
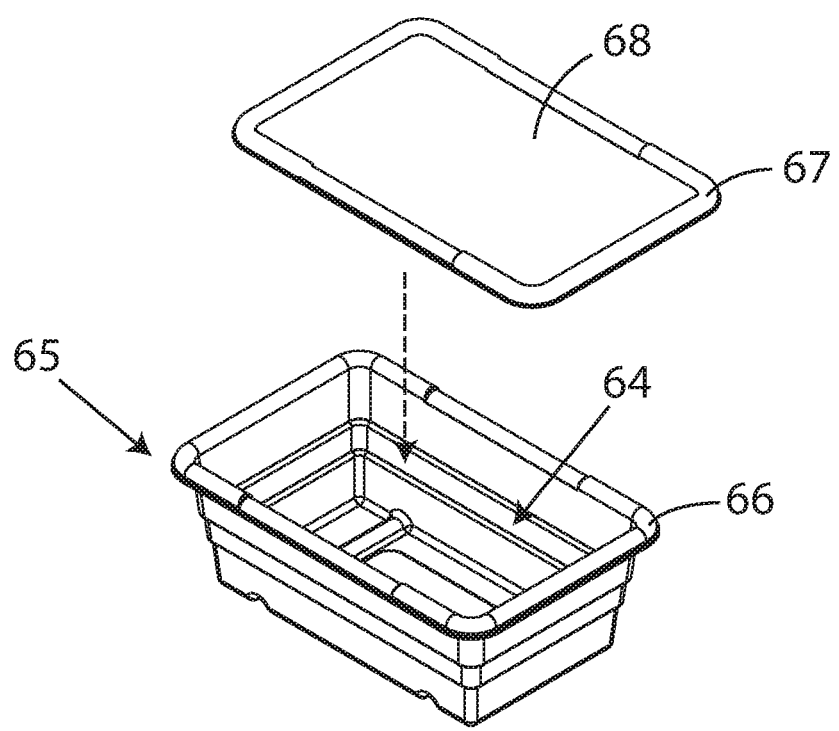
FIG. 5 depicts a perspective view of an embodiment of a container and an associated lid, in accordance with the present invention.

Moreover, embodiments of the opening 25 may allow product items to be passed through the top surface 20 into the interior region 40 of the cart 100. Embodiments of the interior region 40 may be a space, cavity, void, and the like, defined between the plurality of walls 11, 12, 13 and below the top surface 20. For instance, embodiments of the internal region 40 may be an internal cavity, an internal portion, a stowing space, a storage space, and the like. Embodiments of the interior region 40 may include a stowing system 60, as shown in FIG. 2. Embodiments of the stowing system 60 may be disposed within the interior region 40 to stow, store, support, hold, organize, receive, and/or secure one or more containers 65 within the interior region 40. FIG. 4 depicts an embodiment of the inventory processing cart having one or more containers 65 stowed within the interior region 40. The containers 65 may be a container, a lug, a box, a tote, a plastic lug, a plastic container, and the like, configured to receive, store, accept, etc. product items removed from the salesfloor. FIG. 5 depicts an embodiment of a container 65 and a corresponding lid 68. Embodiments of the container 65 may include a receiving region 64 configured to hold contents, such as culled produce, and a lip 66 that may engage the stowing system 60 when in a stowed position. Additionally, embodiments of the container 65 may include a lid 68 that can mate with the container 65 and close, cover, seal, etc. contents stored within the receiving region 64 of the container 65. Embodiments of the container 65 may vary in size, but may be sized and dimensioned to fit within the interior region 40 of body portion 10 of the cart 100. The container 65 and the lid 68 may be comprised of plastic, metal, composites, other lightweight materials, or a combination thereof.

The containers 65 are stowed by a stowing system 60. Embodiments of the stowing system 60 may include a plurality of rails 61a, 61b and a plurality of cross-bars 62a, 62b. The rails 61a, 61b may be operably coupled to an inner surface of the side walls 11, 12. Each rail 61a, 61b may include a rail fixed on the side wall 11 and another rail fixed on the opposing side wall 12 at a same height or location along the walls 11, 12. The rails 61a, 61b may support a load of a container 65 disposed within the interior region 40. For instance, the containers 65 may be suspended from the rails 61a, 61b within the interior region 40. Embodiments of the rails 61a, 61b may be a continuous piece of material, such as aluminum, that extends within the interior region 40, or may be a plurality of metal pieces placed at same heights within the interior region 40. Further, embodiments of the rails 61a, 61b may be a shelf, a lip, or similar flat surface that protrudes from the inner surface of the walls 11, 12. Alternatively, the rails 61a, 61b may form a groove, wherein two shelves, lips, etc. face each other while being spaced apart from each other to define an open channel that receives a portion, such as the lip 66, of the container 65. In other embodiments, the rails 61a, 61b may include rollers or other mechanical device that promotes sliding of the containers 65 in and out of the interior region 40. The cross-bars 62a, 62b of the stowing system 60 may provide additional support for the body portion 10 by connecting to the walls 11, 12, and may also assist the supporting of the containers 65.

Further, the cross-bars 62a, 62b of the stowing system 60 may visually delineate a plurality of zones 41a, 41b, 41c of the interior region 40. For example, the interior region 40 may include a plurality of zones 41a, 41b, 41c, wherein product items being removed from the salesfloor may selectively be placed within a container 65 located in a particular zone of the plurality of zones 41a, 41b, 41c. Each zone 41a, 41b, 41c may represent a classification of removed product, wherein the product removed from the salesfloor that fits the classification can be placed within the container 65 located in that zone. The plurality of zones 41a, 41b, 41c may refer to a first zone 41a associated with a first container 65 stowed within the first zone 41a of the interior region 40 of the cart 100, a second zone 41b associated with a second container 65 stowed within the second zone 41b of the interior region 40 of the cart 100, and a third zone 41c associated with a third container 65 stowed within the third zone 41c of the interior region 40 of the cart 100. In an exemplary embodiment, the first container 65 positioned within the first zone 41a of the interior region 40 may be disposed underneath the opening 25 such that product dropped through the opening 25 may be received within the receiving region 64 of the first container 64. In some embodiments, the cart 100 may accommodate more or less than three classification zones and containers.

Accordingly, products being removed from the salesfloor may be placed within the plurality of zone 41a, 41b, 41c that are classified or otherwise organized based on a plurality of factors. One factor may include a level of damage to the product. The level of damage to the product may refer to a degree of bruising, denting, cracking, breaking, and the like. If the level of damage is at or beyond a certain point, the product can be designated as waste, or if the damage is primarily aesthetic, then the product may still be in donatable condition. Another factor may be a predetermined expiration date, which means that any products still on display past a certain date can be considered waste. Another factor may be a condition or a ripeness of the product, especially in the case of produce. If the produce is at a certain ripeness that a customer may pass up, it may be beneficial to remove the produce item from the salesfloor and donate the particular item. Yet another factor may be whether or not a product is packaged. If a product item is determined to be removed, but includes packaging, it may be beneficial to store the packaged item in a separate container 65 so the packaging may be torn apart out of sight from the customer. An additional factor may include a location a product is found on the salesfloor. If a product is loose, or found on a floor, then the product may be placed in a container 65 dedicated to waste products. Further factors may be considered to determine how to classify and/or organize the plurality of zones 41a, 41b, 41c. Based on the plurality of factors, the removed products may be disposed within the inventory processing cart 100 in one of the containers 65 associated with the plurality of zones 41a, 41b, 41c. In an exemplary embodiment, the plurality of zones 41a, 41b, 41c may be classified by an intended destination. In another embodiment, the plurality of zones 41, 41b, 41c may be classified and/or organized by a type of product. In one exemplary embodiment, the first zone 41a may be for waste product intended to be disposed, the second zone 41b may be for product that is packaged, and the third zone 41c may be for donatable items.

Referring back to FIG. 1, embodiments of the inventory processing cart 100 may include a weighing device 50. The weighing device 50 may be used to account for an amount, such as a weight, mass, or volume, of product being removed from the salesfloor. Embodiments of the weighing device 50 may be a scale, a weighing scale, a weight measuring device, a mass measuring device, and the like. Embodiments of the weighing device 50 may be a digital scale, a spring-based scale, a supermarket or retail scale, or any weighing device that can determine a mass or weight of one or objects placed within or onto the weighing device 50. In some embodiments, the weighing device 50 may be equipped with a label printing mechanism for printing labels containing information about the products being weighed by the weighing device 50. Additionally, the weighing device 50 may include a computing system that can transmit and receive data to/from remote computers and/or servers over short range and long range communication networks, including the Internet. Alternatively, the weighing device 50 may be used to output a weight (e.g., in tenths of a pound), wherein a user may input the weight result into a separate computing device, handheld device or other terminal. The weighing device 50, or the separate handheld computing device, may be connected to a system database or a computing device running software that may assist in accounting for the removed product.

Furthermore, embodiments of the weighing device 50 may be positioned proximate the opening 25 in the top surface 25. The proximity between the weighing device 50 and the opening 25 may be helpful for easy, convenient transfer of removed product from the weighing device to the opening 25, and subsequently into a first container 65 disposed beneath the opening 25 in the first zone 41a of the interior region 40. For example, a user may grab a product, such as a piece of produce, from a product display container 4 positioned on the top surface 20 of the cart 100, determine that the product is waste, place the product in or on the weighing device 50 to determine a weight of the product, and then conveniently dispose of the product from the weighing device 50 to the first container 65 stowed within the cart 100 through the opening 25 located close enough to limit a user's need to reposition or move from his or her position. Accordingly, product, such as produce, may be accounted for at the same time and position on the salesfloor when the product is removed or culled.

The weighing device 50 may be removably mounted on a shelf 30. For example, the weighing device 50 may be removably mounted to the shelf 30 using mounting hardware 39, which may be a removable flange or strip that engages a base portion 56 of the weighing device 50. A body portion 54 of the weighting device 54 may include a display that may indicate the result of the weighing of the product(s). Shelf 30 may be a surface, a shelf, a ledge, a supporting surface, an arm, a plate, and the like, operably coupled to one of the walls 11, 12, 13. In an exemplary embodiment, the shelf 30 may be operably connected to the wall 13. Embodiments of the shelf 30 may protrude a distance from the body portion 10 of the cart 100 to accommodate for the size of the weighing device 50. Embodiments of the shelf 30 may be located a distance below the top surface 20, depending on a height of the weighing device 50. Furthermore, embodiments of the weighing device 50 may be pivotable so that once a weight of a product is recorded, the receptacle 55, such as a bowl or other container, of the weighing device 50 may be pivoted, rotated, and/or tilted so that the product located in the receptacle 55 spills out and falls through the opening 25 and into a container 65.

Referring again to FIGS. 1-3, embodiments of the inventory processing cart 100 may include a bottle holder 37 and a paper towel bar 35 for cleaning and sanitizing the cart 100 and areas of the salesfloor. The bottle holder 37 may be operably coupled to the body portion 10 of the cart 100, wherein the bottle holder is configured to store a sanitizer bottle. In an exemplary embodiment, the bottle holder 37 is attached to the wall 13 proximate the shelf 30. The paper towel bar may also be operably coupled to the body portion 10, or may be operably coupled to the shelf 30. Then combination of the bottle holder 37 and the paper towel bar 35 allow for easy access and carrying means for sanitizer and paper towel so that a user can clean as the user is working on the salesfloor.

Moreover, embodiments of the cart 100 may be operated by an individual via a handle 7, wherein the cart 100 may be transportable via a plurality of wheels 96. Each wheel 96 may be independently lockable for full control of the movement of the cart 100. Embodiments of the cart 100 may be comprised of metal, such as aluminum and stainless steel. Other materials may be used to form the cart 100, as well as combination of metals and other materials. A height, h, of the cart 100 may vary, wherein some embodiments of the cart 100 range from 2.5 feet to 4 feet. In an exemplary embodiment, the distance between a ground surface and the top surface is 36 inches. A length, L, of the cart 100 may also vary, wherein some embodiments of the cart 100 range from 20 inches to 36 inches. In an exemplary embodiment, a length, L, of the cart 100 is 25 inches. Embodiments of the cart 100 may be provided in an assembled configuration, or may be assembled in the field, wherein the cart 100 may come with a plurality of containers 65 and associated lids 68. In one example, the cart 100 may come with nine containers 65 and lids 68.

With reference to FIGS. 1-4, one manner in which the inventory processing cart 100 may be used will now be described. A user may place three containers 65 into the interior region 40 of the body portion 10 of the cart, such that the containers 65 engage with the stowing system 60 and are properly stowed/suspended therein. Each of the three containers 65 are located within one of three zones 41a, 41b, 41c of the interior region 40. The zones 41a, 41b, 41c may be classified as follows: the first zone 41a is for waste product, which includes highly damaged items, loose items, items found on the floor, and expired items, the second zone 41b is for items to be removed from the salesfloor that are packaged or inside of packing, and the third zone 41c is for donatable items, which includes slightly damaged but not spoiled or expired items. The user pushes the cart to a display location on the salesfloor for culling or removal of product. While the product can be grabbed directly from the product display container 4 as it is displayed on the salesfloor, it can be beneficial to remove the product display container 4 from a display position and onto the level surface of the top surface 20 the cart 100, especially in instances where the display containers 4 are displayed on an incline. The user may remove a visibly damaged product item from the product display container 4 located on the cart 100. The visibly damaged item may then be placed onto or into the receptacle 55 of the weighing device 50 to obtain a weight result. The weight result may be recorded by entering data into a handheld computing device. After weighing the visibly damaged item, the user transfers the visibly damaged item into the first container 65 located in the first zone 41a via the opening 25. The next item grabbed is a packaged good that is also damaged. Now, the user weighs the packaged item, and slides the second container 65 located in the second zone 41b out and inserts the packaged item into the second container 65. The next item grabbed by the user includes a small discoloration, but is still safe to eat. Now, the user weighs this item and slides the third container 65 located in the third zone 41c out and inserts the item into the third container 65 to be donated. After finishing on the salesfloor, the user pushes the cart to an area unseen by customers, and removes the containers 65 from the stowing system 60. The first container 65 is sealed by the lid 68 and stored for eventual disposal. The packaged items located in the second container are removed from the packaging, and then stored, lid closed, in the second container 65 for eventual disposal. The donatable items located in the third container 65 may be sealed by the lid 68 and shipped to appropriate locations. Because the top surface/shelf is removable, the user removes the top surface shelf and cleans the exterior and interior region 40 of the cart 100 for the next use.

Accordingly, an inventory can be processed on a salesfloor by using the cart 100, wherein the removed product is accounted for at a same time and location as the product is removed/culled, while the user is available and visible to the customers on the salesfloor.

Referring to FIGS. 1-5, a method of processing inventory with a cart 100, such as cart 100 may include the following steps: partitioning, dividing, classifying, organizing, etc. the interior region 40 of the body portion 10 of the cart 100 into a plurality of zones 41a, 41b, 41c, the plurality of zones 41a, 41b, 41c including a first zone 41a, a second zone 41b, and a third zone 41c, designating the first zone 41a to receive a first type of store product, the second zone 41b to receive a second type of store product, and the third zone 41c to receive a third type of stored product, and accounting for the first type of store product removed from a display area, such as a product display container 4, by weighing the store product with a weighing device 50 positioned proximate the opening 25 in the top surface 20 of the body portion 10, wherein the first zone 41a of the plurality of zones 41a, 41b, 41c may be located beneath the opening 25 in the top surface 20 such that a container 65 stowed within the first zone 41a receives the first type of store product through the opening 25 after the first type of store product is weighed by the weighing device 50.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. An inventory processing cart comprising:
a body portion, the body portion having a top surface and a plurality of walls that define an interior region between the plurality of walls and beneath the top surface;
an opening in the top surface, the opening providing access to the interior region of the body portion;
a side shelf extending from the body portion proximate the opening in the top surface of the body portion;
a weighing device, the weighing device supported by the side shelf; and
a stowing system disposed within the interior region of the body portion, the stowing system configured to receive one or more containers within the interior region of the body portion;
wherein the opening is configured to receive store product that has been accounted for by the weighing device,
wherein the stowing system includes a plurality of rails located within the interior region, the plurality of rails fixed to an inner surface of the body portion to suspend the one or more containers within the interior region, and
wherein the top surface is a removable shelf, the removable shelf being removed for convenient cleaning of the interior region.

2. The inventory processing cart of claim 1, wherein the opening in the top surface is located proximate a lip at a perimeter of the top surface.

3. The inventory processing cart of claim 1, further comprising a paper towel holder operably coupled to the body portion, and a holder operably coupled to the body portion, the holder accommodating a bottle of sanitizer.

4. The inventory processing cart of claim 1, further comprising a plurality of wheels, each wheel of the plurality of wheels being independently lockable.

5. The inventory processing cart of claim 1, wherein a width of the top surface matches a width or a length of a bottom surface of an industry standard reusable plastic container for shipping produce.

6. The inventory processing cart of claim 1, wherein the store product is produce being culled from a salesfloor.

7. A cart for culling produce, comprising:
a body portion having a top surface and a plurality of walls defining an interior region, wherein a stowing system is located within the interior region;
a plurality of zones of the interior region, wherein each zone of the plurality of zones is associated with a container stowed by the stowing system that is designated to receive a different class of culled produce;

a side shelf extending from the body portion proximate the top surface of the body portion; and a weighing device positioned on the side shelf, the weighing device configured to obtain a weight of produce culled from a salesfloor;

wherein a first zone of the plurality of zones is located beneath an opening in the top surface, wherein the stowing system includes a plurality of rails located within the interior region, the plurality of rails fixed to an inner surface of the body portion to suspend the container within the interior region, and wherein the top surface is a removable shelf, the removable shelf being removed for convenient cleaning of the interior region.

8. The cart of claim 7, wherein the first zone is for waste, a second zone is designated for packaged produce and a third zone is for donatable items.

9. The cart of claim 7, wherein a width of the top surface matches a width or a length of a bottom surface of an industry standard reusable plastic container for shipping produce.

10. The cart of claim 7, wherein the opening in the top surface is located proximate a lip at a perimeter of the top surface.

11. The cart of claim 7, wherein the opening is configured to receive culled produce classified as waste that has been accounted for by the weighing device.

* * * * *